United States Patent
Buller et al.

(10) Patent No.: US 9,246,330 B2
(45) Date of Patent: Jan. 26, 2016

(54) PHOTOVOLTAIC DEVICE

(75) Inventors: Benyamin Buller, Perrysburg, OH (US); Dmitriy Marinskiy, Tampa, FL (US)

(73) Assignee: FIRST SOLAR, INC., Perrysburg, OH (US)

( * ) Notice: Subject to any disclaimer, the term of this patent is extended or adjusted under 35 U.S.C. 154(b) by 920 days.

(21) Appl. No.: 13/457,155

(22) Filed: Apr. 26, 2012

(65) Prior Publication Data

US 2012/0280567 A1    Nov. 8, 2012

Related U.S. Application Data

(60) Provisional application No. 61/483,495, filed on May 6, 2011.

(51) Int. Cl.
*H02J 1/00* (2006.01)
*H02J 1/06* (2006.01)

(52) U.S. Cl.
CPC . *H02J 1/06* (2013.01); *Y10T 307/50* (2015.04)

(58) Field of Classification Search
CPC ............. H02J 3/383; H02J 3/385; H02J 7/00; H01L 31/042
USPC .................. 307/84, 77, 138; 136/244; 320/61
See application file for complete search history.

(56) References Cited

U.S. PATENT DOCUMENTS

| | | | |
|---|---|---|---|
| 4,375,662 A * | 3/1983 | Baker | 363/95 |
| 5,153,497 A * | 10/1992 | Eiden | 320/102 |
| 6,331,670 B2 | 12/2001 | Takehara et al. | |
| 6,979,771 B2 | 12/2005 | Mimura | |
| 7,082,019 B2 | 7/2006 | Bodeau et al. | |
| 7,324,361 B2 | 1/2008 | Siri | |
| 7,375,985 B2 | 5/2008 | Wai et al. | |
| 7,957,168 B2 | 6/2011 | Zacharias et al. | |
| 7,969,757 B2 | 6/2011 | Kernahan | |
| 8,004,117 B2 | 8/2011 | Adest et al. | |
| 8,050,804 B2 | 11/2011 | Kernahan | |
| 8,111,528 B2 | 2/2012 | Wu et al. | |
| 8,120,936 B2 | 2/2012 | Duan et al. | |
| 2008/0115822 A1 | 5/2008 | Cunningham et al. | |
| 2008/0143188 A1 | 6/2008 | Adest et al. | |
| 2009/0159113 A1* | 6/2009 | Morimoto | 136/244 |
| 2009/0217964 A1* | 9/2009 | Gilmore et al. | 136/244 |
| 2011/0019454 A1 | 1/2011 | Fotherby | |
| 2011/0031814 A1* | 2/2011 | Giesler | H02J 13/0082 307/77 |
| 2011/0291486 A1 | 12/2011 | Adest et al. | |
| 2012/0014151 A1 | 1/2012 | Alexander | |
| 2012/0024337 A1 | 2/2012 | Bellacicco et al. | |
| 2012/0032665 A1 | 2/2012 | Shaver, II et al. | |
| 2012/0033475 A1 | 2/2012 | Tokuyama et al. | |
| 2012/0039039 A1 | 2/2012 | Nishikimi et al. | |
| 2012/0043923 A1 | 2/2012 | Ikriannikov et al. | |
| 2012/0044014 A1 | 2/2012 | Stratakos et al. | |
| 2012/0073657 A1 | 3/2012 | El-Ghoroury et al. | |

FOREIGN PATENT DOCUMENTS

| | | |
|---|---|---|
| EP | 2 284 982 A1 | 2/2011 |
| JP | 2001-22457 A | 1/2001 |
| WO | WO 2010/128363 A1 | 11/2010 |

* cited by examiner

*Primary Examiner* — Jared Fureman
*Assistant Examiner* — Rafael Pacheco
(74) *Attorney, Agent, or Firm* — Dickstein Shapiro LLP

(57) ABSTRACT

A method and system for operating a photovoltaic module includes providing a reversed electrical bias to the photovoltaic module.

20 Claims, 3 Drawing Sheets

PHOTOVOLTAIC DEVICE

CROSS-REFERENCE TO RELATED APPLICATIONS

This application claims priority to Provisional U.S. Application No. 61/483,495, filed on May 6, 2011, the disclosure of which is incorporated by reference in its entirety herein.

TECHNICAL FIELD

The present invention relates to a photovoltaic system and related methods of operating a photovoltaic module with an electrical bias.

BACKGROUND

A solar cell is a photovoltaic device which converts solar energy into electrical energy. When a solar cell is exposed to solar radiation, solar energy is directly converted to electrical energy. When a solar cell is exposed to operating conditions, its efficiency tends to degrade over time.

DETAILED DESCRIPTION

Figure 1:
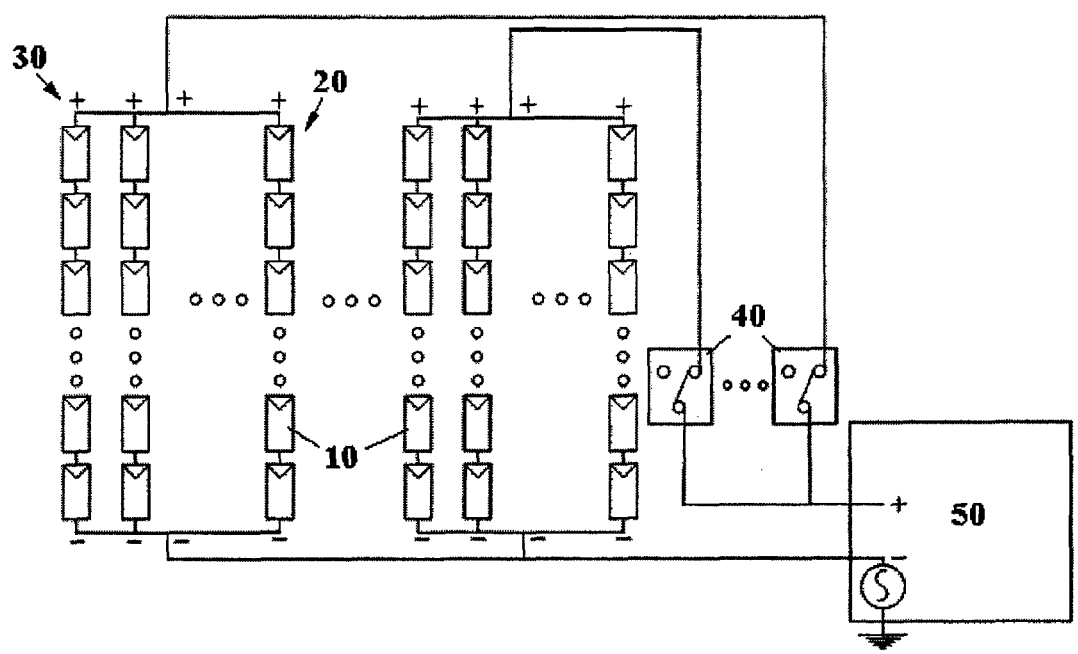
FIG. 1 is a schematic of a standard photovoltaic system.

A photovoltaic module can include a plurality of solar cells packaged and interconnected together in series, in parallel or in a combination thereof. Just as in the case of the solar cells, photovoltaic modules may be connected to each other in series, in parallel or in a combination thereof. Thus, photovoltaic modules may be interconnected to form arrays of photovoltaic modules (i.e., photovoltaic arrays). Each photovoltaic array can be divided into one or more photovoltaic module sub-arrays, which can be connected to each other in series, in parallel or a combination thereof. Positive and negative terminals of the photovoltaic modules or arrays of modules can be electrically connected to a power converter, such as an inverter, which can convert direct current generated by the modules into alternating current, which can then be integrated into a power grid.

Degradation of photovoltaic modules in a photovoltaic array is frequently observed. Such degradation is attributed to operation at near maximum power point condition and can be accelerated by elevated ambient temperature which often results in elevated device temperature. Thin film solar cells such as copper-indium-gallium-selenium (CIGS), cadmium telluride (CdTe), and amorphous silicon (a-Si) often show degradation in their current-voltage behavior after extended periods of time. Typically, when a photovoltaic cell is illuminated, a bias occurs when a current flows. In many cases, the degradation of photovoltaic modules is accelerated by the presence of a bias.

Nonetheless, degradation of some photovoltaic modules may be slowed, minimized, or reversed. Biasing is the method of establishing predetermined voltages at various points of an electronic circuit to set an appropriate operating point. Reverse biasing is applying a voltage that will generate a current in a direction that is opposite to the current generated by an illuminated photovoltaic module. When the reverse bias is applied, some of the mechanisms that cause the degradation of a photovoltaic module are likewise reversed. For example, when a voltage is applied that generates a current in direction opposite to the current generated by an illuminated photovoltaic module, the resulting maximum power voltage is lowered. Thus, reverse biasing can slow, minimize, or reverse degradation, and restore operation of a solar module.

The present invention provides a system and methods of reversing power degradation of photovoltaic devices. The system and methods can include an application of reverse bias on the photovoltaic devices. In some embodiments, the application of an intermittent reverse bias on a solar cell can be used to reverse some of the long term power degradation effects on the cell. This reverse bias application can be performed on a single photovoltaic cell, a photovoltaic module or an array of photovoltaic modules and preferably at night when they are not in use. The magnitude of the negative bias may depend upon the number of cells to be reverse biased as well as the electrical generative power of the cells.

In one aspect, a photovoltaic system can include at least one photovoltaic device having a positive terminal and a negative terminal, an inverter having a positive inverter terminal and a negative inverter terminal, the positive inverter terminal being connected to the positive terminal of the at least one photovoltaic device and the negative inverter terminal being connected to the negative terminal of the at least one photovoltaic device, and a bias reverser connected between the at least one photovoltaic device and the inverter, the bias reverser for effectively reconnecting the positive inverter terminal to the negative terminal of the at least one photovoltaic device and the negative inverter terminal to the positive terminal of the at least one photovoltaic device such that when the inverter outputs electricity, the at least one photovoltaic device is reverse biased.

The bias reverser can be programmed to apply a reverse bias at a predetermined time, or at predetermined time intervals. The photovoltaic system can include at least one switch on the bias reverser to apply a reverse bias to the device. Reverse biasing can be performed at any time of the day. However, reverse biasing during daylight, while a photovoltaic device is exposed to sunlight, for example, can result in more uniform biasing characteristics. For example, during a later part of the day, reverse biasing can be especially effective because photovoltaic devices are exposed to light and still warm, but the current is too low for the inverter to operate. This way, reverse biasing will not be performed at the expense of energy production. Thus a bias reverser can be programmed to apply a reverse bias at this time, for example. A photovoltaic system can further include a controller configured to automatically reverse bias the photovoltaic device based on time, temperature or illumination, for example. The controller can also be configured to control the bias reverser to reverse the bias to at least one photovoltaic module string in a multidimensional array of modules. The controller can further be configured to control the bias reverser to reverse the bias of the photovoltaic module string after the photovoltaic module string is initially biased.

Note that a photovoltaic device can be a cell, a module having a plurality of cells, a string of modules (i.e., a one-dimensional array of modules), a sub-array, or a multi-dimensional array of modules.

The bias reverser can include a first switch configured to electrically connect the positive terminal of the photovoltaic device to either the positive inverter terminal or the negative inverter terminal and a second switch configured to electrically connect the negative terminal of the photovoltaic device to either the negative inverter terminal or the positive inverter terminal. The bias reverser may include a first pair of switches including a first switch configured to electrically connect the positive terminal of a module string and/or sub-array to either the positive inverter terminal or the negative inverter terminal and a second switch configured to electrically connect the negative terminal of the module string and/or sub-array to either the negative inverter terminal or the positive inverter terminal. The bias reverser can include a second pair of switches including a third switch configured to electrically connect the second positive terminal to either the positive inverter terminal or the negative inverter terminal and a fourth switch configured to electrically connect the second negative terminal to either the negative inverter terminal or the positive inverter terminal.

The photovoltaic array can include a plurality of electrically connected photovoltaic module strings connected in parallel. Further, the photovoltaic array may comprise a plurality of sub-arrays. A first sub-array may include less than 25% of the number of photovoltaic modules in the photovoltaic array. A second sub-array may include less than 10% of the number of photovoltaic modules in the photovoltaic array while a third sub-array may include less than 5% of the number of photovoltaic modules in the photovoltaic array.

More than one of the plurality of parallel-connected photovoltaic module strings can be electrically connected to the positive terminal of a module string and/or sub-array and the negative terminal of the module string and/or sub-array. The photovoltaic module can be reverse-biased to a voltage on the order of a maximum power voltage of the photovoltaic array.

In another aspect, a method of operating a photovoltaic device can include exposing the photovoltaic device to light. The photovoltaic device may include a positive terminal electrically connected by a first switch to a positive inverter terminal of an inverter, and a negative terminal electrically connected by a second switch to a negative inverter terminal of the inverter. The method can include applying a reverse bias to the photovoltaic device by switching the first and second switches to electrically connect the positive terminal of the photovoltaic device to the negative inverter terminal and the negative terminal of the photovoltaic device to the positive inverter terminal.

Applying a reverse bias to the photovoltaic module string can include applying a voltage on the order of the maximum power voltage of a photovoltaic array which comprises the photovoltaic device. Applying a reverse bias can be carried out by a controller configured to reverse the bias to the photovoltaic module string. The method can include measuring an illumination of the photovoltaic module and applying the reverse bias based on the illumination. The method can include measuring a temperature of the photovoltaic module and applying the reverse bias based on the temperature. Applying a reverse bias can occur based on the time of day. Applying a reverse bias can occur based on the time elapsed since a prior application of reverse bias. The bias reverser can be programmed to apply a reverse bias at a predetermined time, or at predetermined time intervals.

In another aspect, a method of operating a photovoltaic array can include exposing the photovoltaic array to light. The photovoltaic array can include a first photovoltaic module sub-array and a second photovoltaic module sub-array, each of which can include at least one photovoltaic module string. The photovoltaic module string can include at least one photovoltaic module, a positive sub-array terminal electrically connected by a first switch to a positive inverter terminal of an inverter, and a negative sub-array terminal electrically connected by a second switch to a negative inverter terminal of the inverter. The method can include applying a reverse bias to the first photovoltaic module sub-array by switching the first and second switches of the first photovoltaic module sub-array to electrically connect the positive sub-array terminal to the negative inverter terminal and the negative sub-array terminal to the positive inverter terminal.

Applying a reverse bias to the first photovoltaic module sub-array can decrease a maximum power voltage of the photovoltaic array that is in the order of the maximum power voltage of the array, for example, by less than 10%. Applying a reverse bias to the first photovoltaic module sub-array can also decrease a maximum power voltage of the photovoltaic array by less than 5%. Applying a reverse bias to the first photovoltaic module sub-array can also decrease a maximum power voltage of the photovoltaic array by less than 2% of the maximum power that the array produces.

Referring to FIG. 1, a typical photovoltaic system can include a plurality of photovoltaic modules 10. Each photovoltaic module 10 can have a positive terminal and a negative terminal. A plurality of photovoltaic modules 10 can be connected in series to form a string of connected modules 20. As shown in the figure, a plurality of strings of modules 20 can be connected in parallel to form a plurality of sub-arrays 30. Each sub-array 30 has a positive terminal and a negative terminal. The positive terminal of each sub-array 30 can be connected to a positive terminal of an inverter 50. Likewise, the negative terminal of each sub-array 30 can be connected to a negative terminal of the inverter 50. A plurality of breakers 40, each being interposed between a sub-array 30 and the inverter 50 can be used to open or close the electrical connection between each sub-array 30 and the inverter 50. In some embodiments, breakers 40 are included for assembly/safe disconnect purpose, which allow insulating sub-array from inverter.

Figure 2:
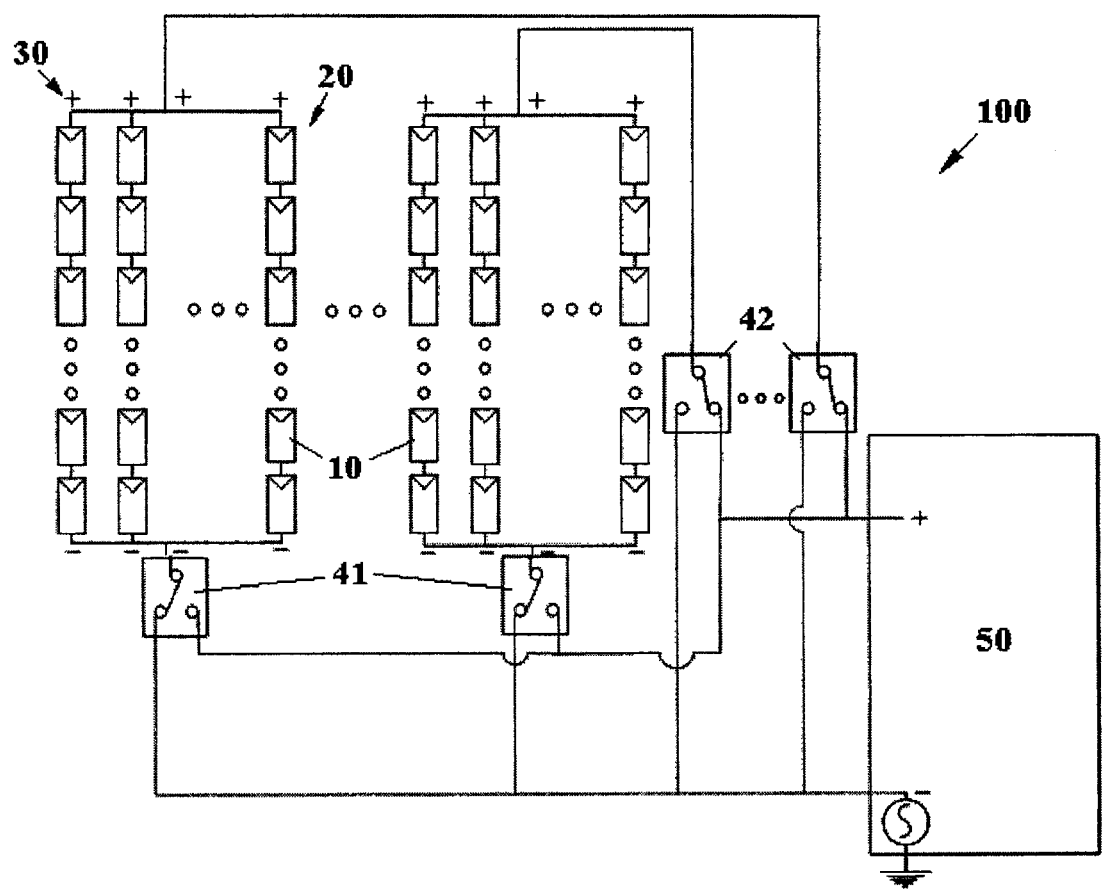
FIG. 2 is a schematic of a photovoltaic system with bias reverser.

Referring to FIG. 2, photovoltaic array 100 can include a plurality of photovoltaic modules 10 connected into photovoltaic module strings 20, which can be further grouped as photovoltaic module sub-arrays 30. The positive terminal of a sub-array 30 can be connected by a switch 42, such as a double-throw switch, to the positive inverter terminal of inverter 50. The negative terminal of a sub-array 30 can be connected by a switch 41, such as a double-throw switch, to the negative inverter terminal of inverter 50. As the photovoltaic modules 10 in photovoltaic array 100 are exposed to light, they can generate direct current, which can be converted to alternating current by inverter 50. It is during this type of operation that photovoltaic modules 10 can become degraded. Such degradation is attributed to operation at near maximum power point condition or long-term effects, such as metal migrations through the p-n junction of the photovoltaic module.

Figure 3:
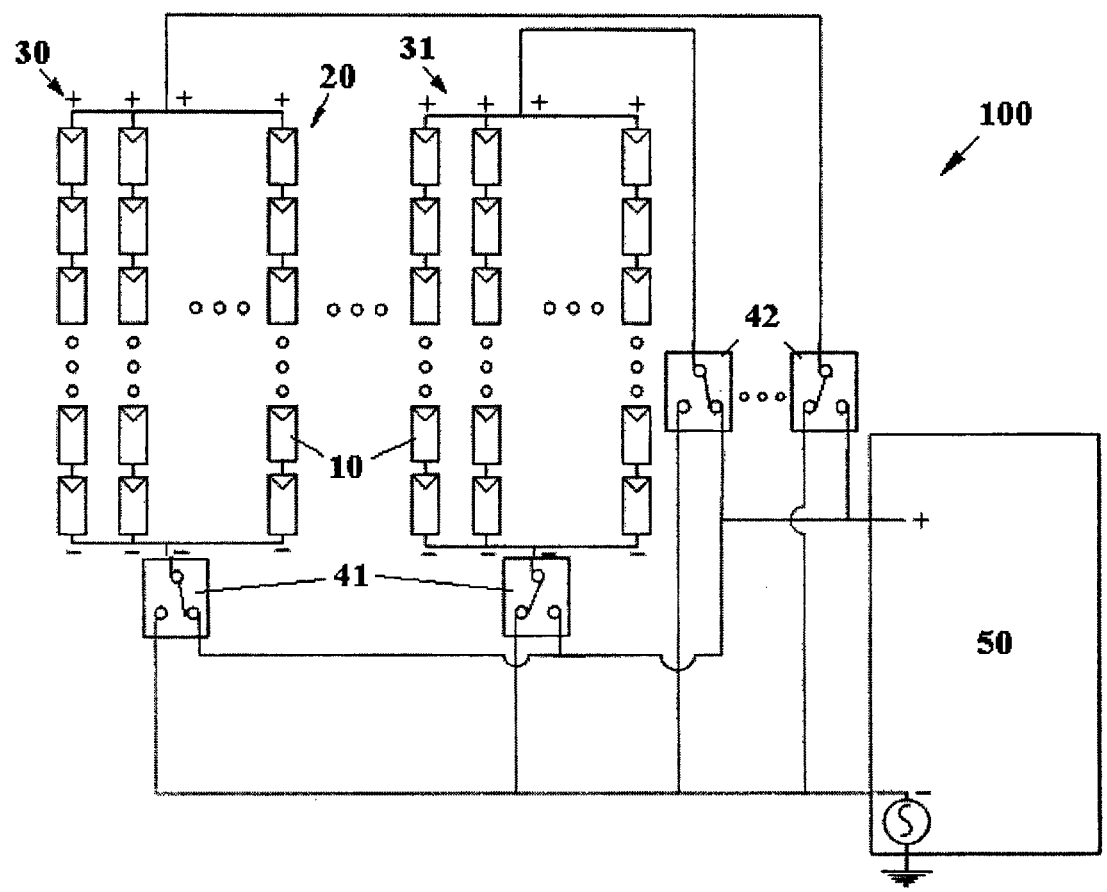
FIG. 3 is a schematic of a photovoltaic system with bias reverser in operating mode.

Referring to FIG. 3, a bias reverser can reverse the bias of the photovoltaic modules 10 in photovoltaic modules strings 20 forming sub-array 30. The bias reverser can include, for example, a pair of switches 41 and 42 connected to the positive terminal and negative terminal, respectively, of one photovoltaic module sub-array 30. The bias reverser can be controlled to switch switches 41 and 42 to electrically connect the positive module string terminal of sub-array 30 to the negative inverter terminal of inverter 50 and to connect the negative module string terminal of sub-array 30 to the positive inverter terminal of inverter 50. This is represented in FIG. 3 by the switching of the two switches connected to the left sub-array 30. Module sub-array 30 can be reverse biased to any suitable voltage, including a voltage that is on the order of the maximum power voltage of array 100.

In some embodiments, more than one sub-array can be reverse biased at the same time. Any suitable number or percentage of modules in photovoltaic array 100 can be reverse biased at the same time. There can be less than 25%, less than 20%, less than 15%, less than 10%, less than 5%, less than 2%, or less than 1% of modules in photovoltaic array 100 reverse biased at the same time.

If there are many sub-arrays (such as 31 and other sub-arrays that are not shown in FIG. 3) in parallel and a portion of them (such as 30 in FIG. 3) are reverse biased in opposite to the rest, the array will operate substantially close to maximum power voltage. When more module sections are connected in reverse polarity, the delivered power and voltage will be lower than when none of the module sections are connected in reverse polarity. When sub-array 30 or any other suitable group of sub-arrays of photovoltaic array 100 are reverse biased, the maximum power voltage of photovoltaic array 100 can be reduced by less than about 20%, less than about 10%, less than about 5%, or less than about 2% of the maximum power that the array produces.

The photovoltaic system can include any suitable controller to control when the bias reverser reverses the bias on sub-array 30. The controller can include a computer or any suitable combination of hardware or software components suitable for controlling the bias reversal. The controller can select any suitable photovoltaic module string 20 or sub-array 30 to reverse bias, while maintaining the remaining photovoltaic module strings and sub-arrays in a state of active photocurrent generation. The controller can reverse the bias of sub-array 30 (for example) based on the temperature of a photovoltaic module 10, based on the illumination of a photovoltaic module 10, based on a time, such as a time of day, or based on the time elapsed since the previous bias, or any suitable combination of these data or any other suitable data. In some embodiments, this reverse biasing can be done during day time when the modules are hot and illuminated. In some embodiments, the reverse biasing can be remotely controlled. In some embodiments, the reverse biasing can be done in principle at the later part of the day, when the modules are still warm but the current is too low for the inverter to operate. Therefore, the reverse biasing can be achieved without the expense of energy production of the system. The reverse biasing of the photovoltaic modules can occur while the photovoltaic module is being heated, or after the photovoltaic module has been heated. The photovoltaic device operating with reverse biasing can have better performance in a long run compared to photovoltaic modules without reverse biasing. In some embodiments, the new operating method of photovoltaic devices can achieve a reduction in the operating cost and longer life time of photovoltaic modules. In some embodiments, the controller can include a human operator.

Photovoltaic modules 10 can include any photovoltaic device, for example, a cadmium telluride (CdTe) photovoltaic device, or any photovoltaic device with a degradation problem. Photovoltaic modules 10 can include any suitable photovoltaic absorber material, including, for example, silicon, such as amorphous silicon.

A number of embodiments of the invention have been described. Nevertheless, it will be understood that various modifications may be made without departing from the spirit and scope of the invention. It should also be understood that the appended drawings are not necessarily to scale, presenting a somewhat simplified representation of various preferred features illustrative of the basic principles of the invention.

What is claimed is:

1. A photovoltaic system comprising:
    at least one photovoltaic device having a positive terminal and a negative terminal;
    an inverter having a positive inverter terminal and a negative inverter terminal, the positive inverter terminal being connected to the positive terminal of the at least one photovoltaic device and the negative inverter terminal being connected to the negative terminal of the at least one photovoltaic device; and
    a bias reverser connected between the at least one photovoltaic device and the inverter, the bias reverser for reconnecting the positive inverter terminal to the negative terminal of the at least one photovoltaic device and the negative inverter terminal to the positive terminal of the at least one photovoltaic device wherein when the inverter outputs electricity at the positive inverter terminal and negative inverter terminal, the at least one photovoltaic device is reverse biased.

2. The photovoltaic system of claim 1, further comprising a controller configured to automatically reverse bias the photovoltaic device.

3. The photovoltaic system of claim 2, wherein the controller is configured to automatically reverse bias the photovoltaic device based on a temperature of the photovoltaic device.

4. The photovoltaic system of claim 2, wherein the controller is configured to automatically reverse bias the photovoltaic device based on time.

5. The photovoltaic system of claim 2, wherein the controller is configured to automatically reverse bias the photovoltaic device based on illumination.

6. The photovoltaic system of claim 1, further comprising at least one switch on the bias reverser to facilitate reverse biasing the device.

7. The photovoltaic system of claim 1, wherein the at least one photovoltaic device comprises an array of photovoltaic devices and the bias reverser reverse biases some of the photovoltaic devices and not others.

8. The photovoltaic system of claim 1, wherein the bias reverser is programmed to apply a reverse bias at a predetermined time.

9. The photovoltaic system of claim 1, wherein the bias reverser is programmed to apply a reverse bias at predetermined time intervals.

10. The photovoltaic system of claim 1, wherein the bias reverser comprises a first pair of switches comprising a first switch configured to electrically connect the positive terminal to either the positive inverter terminal or the negative inverter terminal and a second switch configured to electrically connect the negative terminal to either the negative inverter terminal or the positive inverter terminal.

11. The photovoltaic system of claim 1, wherein the bias reverser comprises:
    a first pair of switches comprising a first switch configured to electrically connect the positive terminal to either the positive inverter terminal or the negative inverter terminal and a second switch configured to electrically connect the negative terminal to either the negative inverter terminal or the positive inverter terminal; and
    a second pair of switches comprising a third switch configured to electrically connect the second positive terminal to either the positive inverter terminal or the negative inverter terminal and a fourth switch configured to electrically connect the second negative terminal to either the negative inverter terminal or the positive inverter terminal.

12. The photovoltaic system of claim 1, wherein the at least one photovoltaic device comprises an array of photovoltaic devices which are device reverse-biased to a voltage on the order of a maximum power voltage of the photovoltaic array.

13. A method of operating a photovoltaic system comprising:
- exposing a photovoltaic system to light, wherein the photovoltaic system comprises:
  - at least one photovoltaic device having a positive terminal and a negative terminal;
  - an inverter having a positive inverter terminal and a negative inverter terminal, the positive inverter terminal being connected to the positive terminal of the at least one photovoltaic device and the negative inverter terminal being connected to the negative terminal of the at least one photovoltaic device; and
  - a bias reverser connected between the at least one photovoltaic device and the inverter, the bias reverser for reconnecting the positive inverter terminal to the negative terminal of the at least one photovoltaic device and the negative inverter terminal to the positive terminal of the at least one photovoltaic device; and
- applying a reverse bias from the inverter to the at least one photovoltaic device when the bias reverser reconnects the positive and negative inverter terminals to the negative and positive terminals of the at least one photovoltaic device.

14. The method of claim 13, wherein applying a reverse bias to the at least one photovoltaic device comprises applying a voltage on the order of the maximum power voltage of a photovoltaic array which comprises the at least one photovoltaic device.

15. The method of claim 13, wherein applying a reverse bias is carried out by a controller configured to reverse the bias to the at least one photovoltaic device.

16. The method of claim 15, wherein the controller is configured to automatically reverse bias the at least one photovoltaic device based on a temperature of the at least one photovoltaic device.

17. The method of claim 15, wherein the controller is configured to automatically reverse bias the at least one photovoltaic device based on time.

18. The method of claim 15, wherein the controller is configured to automatically reverse bias the at least one photovoltaic device based on illumination.

19. The method of claim 13, wherein the bias reverser is programmed to apply a reverse bias at a predetermined time.

20. The method of claim 13, wherein the bias reverser is programmed to apply a reverse bias at predetermined time intervals.

* * * * *